(12) United States Patent
Zheng et al.

(10) Patent No.: US 10,920,115 B2
(45) Date of Patent: Feb. 16, 2021

(54) RESINS FOR USE AS TIE LAYER IN MULTILAYER STRUCTURE AND MULTILAYER STRUCTURES COMPRISING THE SAME

(71) Applicant: Dow Global Technologies LLC, Midland, MI (US)

(72) Inventors: Yong Zheng, Manvel, TX (US); Brian W. Walther, Freeport, TX (US); Santosh S. Bawiskar, Sugar Land, TX (US); Cristina Serrat, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/738,927

(22) PCT Filed: Aug. 5, 2016

(86) PCT No.: PCT/US2016/045798
§ 371 (c)(1),
(2) Date: Dec. 21, 2017

(87) PCT Pub. No.: WO2017/039953
PCT Pub. Date: Mar. 9, 2017

(65) Prior Publication Data
US 2018/0171186 A1    Jun. 21, 2018

Related U.S. Application Data

(60) Provisional application No. 62/280,948, filed on Jan. 20, 2016, provisional application No. 62/212,116, filed on Aug. 31, 2015.

(51) Int. Cl.

| | |
|---|---|
| *B01J 31/00* | (2006.01) |
| *C09J 123/06* | (2006.01) |
| *B32B 27/32* | (2006.01) |
| *B32B 1/08* | (2006.01) |
| *B32B 27/06* | (2006.01) |
| *C08K 5/42* | (2006.01) |
| *C08L 23/06* | (2006.01) |
| *C08L 23/08* | (2006.01) |
| *C08L 51/06* | (2006.01) |
| *B32B 7/12* | (2006.01) |
| *B32B 27/08* | (2006.01) |
| *B32B 27/30* | (2006.01) |
| *B32B 27/34* | (2006.01) |

(52) U.S. Cl.
CPC .............. *C09J 123/06* (2013.01); *B32B 1/08* (2013.01); *B32B 7/12* (2013.01); *B32B 27/06* (2013.01); *B32B 27/08* (2013.01); *B32B 27/306* (2013.01); *B32B 27/32* (2013.01); *B32B 27/327* (2013.01); *B32B 27/34* (2013.01); *C08K 5/42* (2013.01); *C08L 23/06* (2013.01); *C08L 23/0815* (2013.01); *C08L 51/06* (2013.01); *B32B 2250/03* (2013.01); *B32B 2250/04* (2013.01); *B32B 2250/05* (2013.01); *B32B 2250/24* (2013.01); *B32B 2270/00* (2013.01); *B32B 2307/7244* (2013.01); *B32B 2307/7246* (2013.01); *B32B 2439/40* (2013.01); *B32B 2439/46* (2013.01); *B32B 2597/00* (2013.01); *C08L 2201/14* (2013.01); *C08L 2203/16* (2013.01); *C08L 2207/062* (2013.01)

(58) Field of Classification Search
CPC ..... B32B 27/306; B32B 27/32; B32B 27/327; B32B 2250/05; B32B 2307/7244; B32B 2250/24; B32B 2307/7246; B32B 2597/00; B32B 2250/04; B32B 2270/00; B32B 2439/46; B32B 2439/40; B32B 2250/03; B32B 7/12; B32B 1/08; B32B 27/08; B32B 27/06; B32B 27/34; C09J 123/06; C08K 5/42; C08L 23/06; C08L 51/06; C08L 23/0815; C08L 2203/16; C08L 2207/062; C08L 2201/14
See application file for complete search history.

(56) References Cited

U.S. PATENT DOCUMENTS

| | | |
|---|---|---|
| 3,645,992 A | 2/1972 | Dow |
| 3,914,342 A | 10/1975 | Mitchell |
| | (Continued) | |

FOREIGN PATENT DOCUMENTS

| | | |
|---|---|---|
| CN | 103753914 A | 4/2014 |
| JP | H01-139347 A | 5/1989 |
| | (Continued) | |

OTHER PUBLICATIONS

PCT/US2016/045798, International Search Report and Written Opinion dated Oct. 5, 2016.

(Continued)

*Primary Examiner* — Samir Shah

(57) ABSTRACT

The present invention provides resins that can be used as a tie layer in a multilayer structure and to multilayer structures including one or more tie layers formed from such resins. In one aspect, a resin for use as a tie layer in a multilayer structure that includes a high density polyethylene having a density greater than 0.960 g/cm3, wherein the high density polyethylene includes 1 to 99 weight percent of the resin, a maleic anhydride grafted high density polyethylene, wherein the maleic anhydride grafted high density polyethylene includes 1 to 99 weight percent of the resin, and a catalyst including at least one Lewis acid.

13 Claims, No Drawings

(56) References Cited

U.S. PATENT DOCUMENTS

| | | | |
|---|---|---|---|
| 4,076,698 A | 2/1978 | Anderson et al. | |
| 4,599,392 A | 7/1986 | McKinney et al. | |
| 5,240,525 A | 8/1993 | Percec et al. | |
| 5,272,236 A | 12/1993 | Lai et al. | |
| 5,278,272 A | 1/1994 | Lai et al. | |
| 5,582,923 A | 12/1996 | Kale et al. | |
| 5,643,997 A | 7/1997 | Matsuoka et al. | |
| 5,733,155 A | 3/1998 | Sagawa et al. | |
| 5,854,045 A | 12/1998 | Fang et al. | |
| 5,981,636 A | 11/1999 | Amos et al. | |
| 6,300,398 B1 * | 10/2001 | Jialanella | C08L 23/0815 524/275 |
| 6,511,936 B1 * | 1/2003 | Theopold | C07F 9/00 502/167 |
| 6,559,211 B2 | 5/2003 | Zhao et al. | |
| 6,835,777 B2 | 12/2004 | Botros | |
| 7,794,848 B2 | 9/2010 | Breese | |
| 8,436,085 B2 | 5/2013 | Borke et al. | |
| 8,734,922 B2 | 5/2014 | Bellini et al. | |
| 2003/0171524 A1 | 9/2003 | Mihan et al. | |
| 2006/0008604 A1 | 1/2006 | Flat et al. | |
| 2007/0054142 A1 | 3/2007 | Lee et al. | |
| 2009/0035594 A1 | 2/2009 | Lee et al. | |
| 2010/0098935 A1 | 4/2010 | McGee et al. | |
| 2010/0292403 A1 * | 11/2010 | Ansems | C08F 8/32 525/125 |
| 2011/0237723 A1 * | 9/2011 | Yano | C08G 18/4854 524/141 |
| 2013/0045353 A1 | 2/2013 | Menage | |
| 2013/0225743 A1 | 8/2013 | Aubee et al. | |

FOREIGN PATENT DOCUMENTS

| | | |
|---|---|---|
| WO | 2013184187 A1 | 12/2013 |
| WO | 2014/035483 A1 | 3/2014 |
| WO | 2014/043522 A1 | 3/2014 |
| WO | 2014/105404 A1 | 7/2014 |
| WO | 2014/113623 A2 | 7/2014 |
| WO | 2016/094155 A1 | 6/2016 |

OTHER PUBLICATIONS

PCT/US2016/045798, International Preliminary Report on Patentability dated Jul. 25, 2017.

* cited by examiner

RESINS FOR USE AS TIE LAYER IN MULTILAYER STRUCTURE AND MULTILAYER STRUCTURES COMPRISING THE SAME

FIELD

The present invention relates to resins that can be used as a tie layer in a multilayer structure and to multilayer structures comprising one or more tie layers formed from such resins.

INTRODUCTION

There are many applications where there is a need for a high gas barrier such as in food packaging, silage wrap, stretch hooder applications, composite pipes, and others. In multilayer barrier structures, ethylene vinyl alcohol (EVOH) copolymers are the primary materials used to construct the barrier layer to block oxygen and other gases. Polyamide (e.g., nylon) and other materials are also used widely to provide similar functions. However, one issue with such barrier layers is that the gas barrier properties deteriorate when the multilayer structure incorporating the barrier layer is exposed to high moisture or relative humidity. One approach to minimize deterioration of the barrier layer is to increase the thickness of polyethylene layers around the EVOH or nylon to prevent moisture ingression. For example, if layers of low density polyethylene (LDPE) or linear low density polyethylene (LLDPE) are in a multilayer structure comprising EVOH or nylon layers, the thickness of the LDPE or LLDPE layers can be increased to decrease the permeation rate of moisture. As another example, layer(s) of high density polyethylene (HDPE) have been included adjacent to the EVOH or nylon layers to prevent moisture ingression. Another approach to minimize deterioration of the barrier layer is to increase the thickness of an EVOH or polyamide layer in the multilayer structure to compensate for barrier loss.

There remains a need for alternative approaches to minimize loss of gas barrier properties of multilayer structures while maintaining other desirable properties and overall cost of multilayer structures.

SUMMARY

The present invention provides tie resin formulations that in some aspects deliver a unique combination of adhesion, moisture barrier, and stiffness suitable for multilayer structures. For example, in some aspects, tie layers formed from such resins not only bind different layers together (e.g., a polyethylene layer with EVOH or nylon), but can also exhibit improved moisture and/or oxygen barrier properties. Such tie layers, in some aspects, can advantageously maintain barrier performance of multilayer structures under high moisture conditions without relying on additional LDPE, LLPDE, HDPE, EVOH, and/or nylon as utilized in previous approaches to protecting against barrier loss.

In one aspect, the present invention provides a resin for use as a tie layer in a multilayer structure, the resin comprising a high density polyethylene having a density greater than 0.960 g/cm$^3$, wherein the high density polyethylene comprises 1 to 99 weight percent of the resin, a maleic anhydride grafted high density polyethylene, wherein the maleic anhydride grafted high density polyethylene comprises 1 to 99 weight percent of the resin, and a catalyst comprising at least one Lewis acid.

In another aspect, the present invention provides a multilayer structure comprising at least three layers, each layer having opposing facial surfaces and arranged in the order A/B/C, wherein Layer A comprises polyethylene, wherein Layer B comprises a resin for a tie layer according to any of the embodiments disclosed herein, wherein a top facial surface of Layer B is in adhering contact with a bottom facial surface of Layer A, and wherein Layer C comprises polyamide, ethylene vinyl alcohol, or combinations thereof, wherein a top facial surface of Layer C is in adhering contact with a bottom facial surface of Layer B. In various embodiments, the multilayer structure can be a film, a sheet, a rigid container, a pipe, and other items having a polymeric construction with two or more layers having different compositions.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792.

"Melt index": Melt indices $I_2$ (or I2) and $I_{10}$ (or I10) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

"Secant Modulus (1%)" and "Secant Modulus (2%)" are determined in accordance with ASTM D882.

"Clarity" is determined in accordance with ASTM D1746.

"Haze" is determined in accordance with ASTM D1003.

"Water Vapor Transmission Rate" or "WVTR" is determined in accordance with ASTM F-1249 using a Mocon Permatran WVTR testing system at a relative humidity of 90% and a temperature of 37.8° C.

"Oxygen Transmission Rate" or "OTR" is determined in accordance with ASTM D3985 using a Mocon Oxtran OTR testing system at an oxygen content of 100%, a relative humidity of 90%, and a temperature of 23° C.

"Adhesion strength" is determined in accordance with ASTM F-904.

Additional properties and test methods are described further herein.

In one aspect, the present invention provides a resin for use as a tie layer in a multilayer structure that comprises a high density polyethylene having a density greater than 0.960 g/cm$^3$, wherein the high density polyethylene comprises 1 to 99 weight percent of the resin, a maleic anhydride grafted high density polyethylene, wherein the maleic anhydride grafted high density polyethylene comprises 1 to 99 weight percent of the resin, and a catalyst comprising at least one Lewis acid.

In some embodiments, the catalyst comprises a metal triflate, a metal chloride, a metal bromide, a metal tetrafluoroborate, or combinations thereof. For example, in some embodiments where the catalyst comprises a metal triflate, the metal triflate can be zinc triflate, bismuth triflate, copper triflate, magnesium triflate, nickel triflate, tin triflate, or combinations thereof. In some embodiments where the catalyst comprises a metal chloride or a metal boride, the metal chloride or boride can comprise cobalt chloride, zinc chloride, nickel chloride, cobalt bromide, zinc bromide, nickel bromide, or combinations thereof. In some embodiments where the catalyst comprises a metal tetrafluoroborate, the metal tetrafluoroborate can comprise copper tetrafluoroborate, zinc tetrafluoroborate, cobalt tetrafluoroborate, or combinations thereof. The resin comprises 10-200 parts per million by weight of the catalyst based on the total weight of the resin in some embodiments.

In some embodiments, the resin is substantially free of organometallic compounds and/or metal carboxylates.

In some embodiment, the resin further comprises a nucleator.

In some embodiment, the high density polyethylene has a density greater than 0.962 g/cm$^3$. The high density polyethylene comprises 70 to 95 weight percent of the resin in some embodiments.

The maleic anhydride grafted high density polyethylene, in some embodiments, has a density greater than 0.962 g/cm$^3$. In some embodiments, the maleic anhydride grafted high density polyethylene has a grafted maleic anhydride level of 0.1 to 2.0 wt % maleic anhydride based on the weight of the maleic anhydride grafted high density polyethylene. The maleic anhydride grafted high density polyethylene comprises 5 to 30 weight percent of the resin in some embodiments.

In some embodiments, the resin further comprises a polyolefin elastomer. The polyolefin elastomer can be a block copolymer in some embodiments. In some embodiments comprising a polyolefin elastomer, the resin comprises less than 5 weight percent polyolefin elastomer based on the total weight of the resin.

The resin can comprise a combination of two or more embodiments as described herein.

Embodiments of the present invention also relate to multilayer structures that include a layer formed from a resin of the present invention. In one aspect, a multilayer structure comprises at least three layers, each layer having opposing facial surfaces and arranged in the order A/B/C, wherein Layer A comprises polyethylene, wherein Layer B comprises a resin for a tie layer according to any of the embodiments disclosed herein, wherein a top facial surface of Layer B is in adhering contact with a bottom facial surface of Layer A, and wherein Layer C comprises polyamide, ethylene vinyl alcohol, or combinations thereof, wherein a top facial surface of Layer C is in adhering contact with a bottom facial surface of Layer B. The multilayer structure, in some embodiments, comprises a multilayer film. In some embodiments, Layer C comprises ethylene vinyl alcohol and further comprises a polyolefin elastomer. Layer C, in some embodiments, comprises polyamide and further comprises a modifier to enhance flex crack resistance. Examples of modifiers that can be included to enhance flex crack resistance include polyolefin elastomers, maleic anhydride modified elastomers, and others.

In some embodiments, Layer B exhibits a water vapor transmission rate of 8 g·mil/m$^2$/day or less when measured according to ASTM F1249. In some embodiments, Layer B exhibits a water vapor transmission rate of 3.1 g·mil/m$^2$/day or less when measured according to ASTM F1249. Layer B, in some embodiments, exhibits a water vapor transmission rate of 1.0 g·mil/m$^2$/day or less when measured according to ASTM F1249.

In some embodiments where the multilayer structure comprises three layers in an A/B/C arrangement, the structure can further comprise Layer D, wherein a top facial surface of Layer D is in adhering contact with a bottom facial surface of Layer C. In some such embodiments, Layer D can comprise a layer formed from any of the resins for a tie layer according to any of the embodiments disclosed herein.

In another embodiment, a multilayer structure comprises at least three layers, each layer having opposing facial surfaces and arranged in the order A/B/C, wherein: Layer A comprises polyethylene; Layer B comprises (a) a high density polyethylene, wherein the high density polyethylene comprises 1 to 99 weight percent based on the weight of the Layer B, (b) a maleic anhydride grafted high density polyethylene, wherein the maleic anhydride grafted high density polyethylene comprises 1 to 99 weight percent based on the weight of Layer B, and (c) a catalyst comprising at least one Lewis acid, wherein a top facial surface of Layer B is in adhering contact with a bottom facial surface of Layer A; and Layer C comprises polyamide, ethylene vinyl alcohol, or combinations thereof, wherein a top facial surface of Layer C is in adhering contact with a bottom facial surface of Layer B, wherein Layer B exhibits a water vapor transmission rate of 8 g·mil/m$^2$/day or less when measured according to ASTM F1249. In some embodiments, Layer B exhibits a water vapor transmission rate of 3.1 g·mil/m$^2$/day or less when measured according to ASTM F1249. Layer B, in some embodiments, exhibits a water vapor transmission rate of 1.0 g·mil/m$^2$/day or less when measured according to ASTM F1249.

Multilayer structures of the present invention comprise a combination of two or more embodiments as described herein.

Multilayer films of the present invention comprise a combination of two or more embodiments as described herein.

Embodiments of the present invention also relate to articles comprising any of the multilayer structures (e.g., multilayer films) disclosed herein.

Embodiments of the present invention also relate to methods of preparing resins for use as a tie layer in a multilayer structure. In one embodiment, a method comprises compounding a first high density polyethylene having a density greater than 0.960 g/cm$^3$ with a catalyst comprising at least one Lewis acid to form a first composition, blending the first composition with a second high density polyethylene having a density greater than 0.960 g/cm$^3$, a maleic anhydride grafted high density polyethylene, wherein the second high density polyethylene comprises 1 to 99 weight percent of the resin, wherein the maleic anhydride grafted high density polyethylene comprises 1 to 99 weight percent of the resin, and wherein the first high density polyethylene has a melt index ($I_2$) greater than the melt index ($I_2$) of the second high density polyethylene.

Resin for Tie Layer

Resins for use as tie layers according to embodiments of the present invention comprise a high density polyethylene, a maleic anhydride grafted high density polyethylene, and a catalyst comprising at least one Lewis acid as discussed further herein.

With regard to the high density polyethylene, the high density polyethylene can generally be prepared with Ziegler-Natta catalysts, chrome catalysts or single-site catalysts including, but not limited to, bis-metallocene catalysts and constrained geometry catalysts.

The high density polyethylene has a density greater than 0.960 g/cm$^3$ in some embodiments. The high density polyethylene has a density of 0.960 g/cm$^3$ to 0.975 g/cm$^3$ in some embodiments. All individual values and subranges from 0.960 g/cm$^3$ to 0.975 g/cm$^3$ are included herein and disclosed herein; for example, the density of the high density polyethylene can be from a lower limit of 0.960, 0.961, 0.962, 0.963, 0.964, 0.965, 0.966, 0.968, 0.970, or 0.972 g/cm$^3$ to an upper limit of 0.965, 0.966, 0.967, 0.968, 0.969, 0.970, 0.971, 0.972, 0.973, 0.974, or 0.975 g/cm$^3$. In some embodiments, the high density polyethylene has a density from 0.961 to 0.969 g/cm$^3$, preferably 0.962 to 0.968 g/cm$^3$, more preferably 0.963 to 0.968 g/cm$^3$.

In some embodiments, the high density polyethylene has a melt index ($I_2$) of 0.5 g/10 minutes or greater. The high density polyethylene has a melt index ($I_2$) of up to 30 g/10 minutes in some embodiments. All individual values and subranges up to 30 g/10 minutes are included herein and disclosed herein. For example, the high density polyethylene can have a melt index to an upper limit of 3, 5, 10, 15, 20, 25, or 30 g/10 minutes. In some embodiments, the high density polyethylene can have a melt index of 0.5 to 30 g/10 minutes, preferably 0.85 to 10 g/10 minutes. As known to those skilled in the art, the melt index of the high density polyethylene will depend on the targeted process. For example, in a blown film coextrusion manufacturing line, a melt index of 0.85 to 3 g/10 minutes may be appropriate whereas for an extrusion coating process, a preferred melt index range may be 5 to 10 g/10 minutes.

The high density polyethylene is nucleated in some embodiments. That is, a nucleator is incorporated into the high density polyethylene. The nucleation of high density polyethylene is believed to improve the barrier properties of the polyethylene when formed into a film layer. A variety of nucleators can be used to nucleate the high density polyethylene including, for example and without limitation, calcium cyclic dicarboxylate (such as described in U.S. Pat. No. 6,559,211 which is hereby incorporated by reference), disodium bicycloheptene dicaroxylate (such as described in U.S. Pat. No. 5,981,636, which is hereby incorporated by reference), and Hyperform HPN-20E which is commercially available from Milliken Chemical. Once nucleated, the nucleator is incorporated within the high density polyethylene such that the high density polyethylene then comprises nucleator. In some embodiments, nucleated high density polyethylene comprises 100 to 3000 ppm nucleator, preferably 500 to 2000 ppm nucleator, more preferably 750 to 1500 ppm nucleator, based on the total weight of the nucleated polyethylene.

Examples of commercially available high density polyethylenes that can be used in some embodiments of the present invention include, DOW ELITE™ 5960G, DMDA 8007, and DMDA 6400, each of which are commercially available from The Dow Chemical Company, as well as high density polyethylenes commercially available from NOVA Chemicals. Such high density polyethylene resins can be nucleated using techniques known to those of skill in the art based on the teachings herein.

With regard to the maleic anhydride grafted high density polyethylene, the high density polyethylene that is grafted with maleic anhydride can generally be any of those described above.

In some embodiments, the high density polyethylene to be grafted with maleic anhydride is nucleated. That is, a nucleator is incorporated into the high density polyethylene before, after, or during the grafting process step. A variety of nucleators can be used to nucleate the high density polyethylene including, for example and without limitation, calcium cyclic dicarboxylate (such as described in U.S. Pat. No. 6,559,211 which is hereby incorporated by reference), disodium bicycloheptene dicaroxylate (such as described in U.S. Pat. No. 5,981,636, which is hereby incorporated by reference), and Hyperform HPN-20E which is commercially available from Milliken Chemical. Once nucleated, the nucleator is incorporated within the high density polyethylene such that the high density polyethylene then comprises nucleator. In some embodiments, nucleated high density polyethylene comprises 100 to 3000 ppm nucleator, preferably 500 to 2000 ppm nucleator, more preferably 750 to 1500 ppm nucleator, based on the total weight of the nucleated polyethylene.

The resin for use in the tie layer comprises 1 to 99 weight percent high density polyethylene based on the weight of the resin in some embodiments. In some embodiments, the resin comprises up to 95 weight percent high density polyethylene based on the weight of the resin in some embodiments. In some embodiments, the resin comprises at least 70 weight percent of the high density polyethylene based on the weight of the resin. In some embodiments, the resin can comprise 50 to 95 wt % high density polyethylene based on the weight of the resin. All individual values and subranges from 50 to 95 wt % are included and disclosed herein; for example, the amount of the high density polyethylene in the resin for the tie layer can be from a lower limit of 50, 55, 60, 65, 70, 75, or 80 wt % to an upper limit of 75, 80, 85, 90 or 95 wt %. For example, the amount of high density polyethylene in the resin for the tie layer can be from 70 to 95 wt %, or in the alternative, from 75 to 95 wt %, or in the alternative, from 77 to 92 wt %, or in the alternative, from 80 to 92 wt %. When the high density polyethylene is nucleated, the above weight percentages of high density polyethylene should be understood to also include the nucleator as well.

In embodiments where the non-grafted high density polyethylene is nucleated, the high density polyethylene is preferably nucleated prior to grafting with maleic anhydride.

The high density polyethylene can be grafted with maleic anhydride using techniques known to those of skill in the art based on the teachings herein. For example, the grafting process can be carried out using reactive extrusion.

In some embodiments, the maleic anhydride-graft level is from 0.04 to 3.0 weight percent maleic anhydride based on the weight of the maleic anhydride grafted high density polyethylene. The maleic anhydride-graft level is from 0.1 to 3.0 weight percent maleic anhydride based on the weight of the maleic anhydride grafted high density polyethylene in some embodiments. The maleic anhydride-graft level, in some embodiments, is from 0.5 to 1.5 weight percent maleic anhydride based on the weight of the maleic anhydride grafted high density polyethylene.

The maleic anhydride grafted high density polyethylene has a density greater than 0.960 g/cm$^3$ in some embodiments. The maleic anhydride grafted high density polyethylene has a density of 0.960 g/cm$^3$ to 0.973 g/cm$^3$ in some embodiments. All individual values and subranges from 0.960 g/cm$^3$ to 0.973 g/cm$^3$ are included herein and disclosed herein; for example, the density of the maleic anhydride grafted high density polyethylene can be from a lower limit of 0.960, 0.961, 0.962, 0.963, 0.964, 0.965, 0.966, 0.967, or 0.968 g/cm$^3$ to an upper limit of 0.965, 0.966, 0.967, 0.968, 0.969, 0.970, 0.971, 0.972, or 0.973 g/cm$^3$. In some embodiments, the maleic anhydride grafted high density polyethylene has a density from 0.961 to 0.969 g/cm$^3$, preferably 0.962 to 0.968 g/cm$^3$, more preferably 0.963 to 0.968 g/cm$^3$.

In some embodiments, the maleic anhydride grafted high density polyethylene has a melt index ($I_2$) of 0.5 g/10 minutes or greater. The maleic anhydride grafted high density polyethylene has a melt index ($I_2$) of up to 30 g/10 minutes in some embodiments. All individual values and subranges up to 30 g/10 minutes are included herein and disclosed herein. For example, the maleic anhydride grafted high density polyethylene can have a melt index to an upper limit of 3, 5, 10, 15, 20, 25, or 30 g/10 minutes. In some embodiments, the maleic anhydride grafted high density polyethylene can have a melt index of 0.5 to 30 g/10 minutes, preferably 0.85 to 10 g/10 minutes. As known to those skilled in the art, the melt index of the maleic anhydride grafted high density polyethylene will depend on the targeted process. For example, in a blown film coextrusion manufacturing line, a melt index of 0.85 to 3 g/10 minutes may be appropriate whereas for an extrusion coating process, a preferred melt index range may be 5 to 10 g/10 minutes.

Examples of commercially available high density polyethylenes that can be grafted with maleic anhydride and used in some embodiments of the present invention include, DOW ELITE™ 5960G, DMDA 8007, and DMDA 6400, each of which are commercially available from The Dow Chemical Company, as well as high density polyethylenes commercially available from NOVA Chemicals. Such high density polyethylene resins can be nucleated prior to grafting of maleic anhydride using techniques known to those of skill in the art based on the teachings herein.

The resin for use in the tie layer comprises 1 to 99 weight percent maleic anhydride grafted high density polyethylene based on the weight of the resin in some embodiments. In some embodiments, the resin comprises up to 30 weight percent maleic anhydride grafted high density polyethylene based on the weight of the resin in some embodiments. In some embodiments, the resin comprises at least 5 weight percent of the maleic anhydride grafted high density polyethylene based on the weight of the resin. In some embodiments, the resin can comprise 5 to 30 wt % maleic anhydride grafted high density polyethylene based on the weight of the resin. All individual values and subranges from 5 to 30 wt % are included and disclosed herein; for example, the amount of the maleic anhydride grafted high density polyethylene in the resin for the tie layer can be from a lower limit of 5, 7, 10, 12, 15, or 20 wt % to an upper limit of 15, 20, 22, 25, 27, or 30 wt %. For example, the amount of maleic anhydride grafted high density polyethylene in the resin for the tie layer can be from 5 to 30 wt %, or in the alternative, from 10 to 25 wt %, or in the alternative, from 12 to 25 wt %, or in the alternative, from 12 to 22 wt %. When the maleic anhydride grafted high density polyethylene is nucleated, the above weight percentages of maleic anhydride grafted high density polyethylene should be understood to also include the nucleator as well.

The resins for use as tie layers according to embodiments of the present invention further comprise a catalyst. The catalyst can advantageously be included to promote the adhesion of the tie layer to an adjacent barrier layer in some embodiments. With the usage of high density polyethylene and maleic anhydride grafted polyethylene in the resin for the tie layer, the adhesion to a barrier layer may need to be enhanced to meet the application performance requirements. Thus, the catalyst can be included to promote the adhesion strength.

The resins for use as a tie layer according to some embodiments of the present invention can be used in tie layers to adhere a barrier layer to another layer comprising polyethylene. As barrier layers typically comprise ethylene vinyl alcohol and/or polyamide, the catalyst, in some embodiments, can be selected so as to promote a reaction between maleic anhydride functional groups in the maleic anhydride high density polyethylene with hydroxyl groups in the ethylene vinyl alcohol and/or amine groups in the polyamide of a barrier layer. Catalysts comprising at least one Lewis acid are believed to be particularly well-suited for such embodiments.

Thus, in some embodiments, a resin for use as a tie layer comprises a catalyst comprising at least one Lewis acid. As generally understood, a Lewis acid is a chemical species that can receive a pair of electrons from another molecule (a Lewis base) to form a Lewis adduct. In some embodiments, the catalyst comprises at least one Lewis acid effective to catalyze acylation of alcohols and amines. In some such embodiments, the catalyst comprises a metal triflate, a metal chloride, a metal bromide, a metal tetrafluoroborate, or combinations thereof. Examples of metal triflates that can be used as catalysts in some embodiments of the present invention include zinc triflate, bismuth triflate, copper triflate, magnesium triflate, nickel triflate, tin triflate, or combinations thereof. Examples of metal chlorides that can be used as catalysts in some embodiments of the present invention include cobalt chloride, zinc chloride, nickel chloride, or combinations thereof. Examples of metal bromides that can be used as catalysts in some embodiments include cobalt bromide, zinc bromide, nickel bromide, or combinations thereof. Examples of metal tetrafluoroborates that can be used as catalysts in some embodiments of the present invention include copper tetrafluoroborate, zinc tetrafluoroborate, cobalt tetrafluoroborate, or combinations thereof.

In some embodiments, the catalyst does not include organometallic compounds. In other words, in such embodiments, the catalyst does not comprise a compound having a covalent bond between a metal atom and a carbon atom. In some embodiments, the catalyst does not include metal carboxylates.

The amount of catalyst used in the resin can depend on a number of factors including the amount of high density polyethylene in the resin, the amount of maleic anhydride grafted polyethylene in the resin, the catalyst used, the composition of the barrier layer and other layers adjacent to the tie layer formed from the resin, and other factors. In some embodiments, the resin comprises 10 to 2000 parts per million by weight of the catalyst based on the total weight of the resin. The resin, in some embodiments, comprises 20 to 2000 parts per million by weight of the catalyst based on the total weight of the resin. The resin comprises 50 to 500 parts per million by weight of the catalyst based on the total weight of the resin in some embodiments.

In some embodiments, the resin for use in a tie layer may further comprise a polyolefin elastomer. For example, polyolefin elastomer may be provided to reduce the rigidity and/or improve the adhesion of the tie layer formed from the resin. In some embodiments, the polyolefin elastomer can be a block copolymer. In some embodiments where polyolefin elastomer is used in the resin, the resin can comprise 5 weight percent or less of the polyolefin elastomer based on the total weight of the resin. Examples of commercially available polyolefin elastomers can be used in some embodiments of the present invention include, polyolefin elastomers available from The Dow Chemical Company under the names ENGAGE™, AFFINITY™, and INFUSE™, such as ENGAGE™ 8402, and AFFINITY™ P1 1881G. The level of elastomer added to the tie layer will need to be selected so as to ensure that there is not a significant loss in barrier properties in the tie layer. Thus, when the tie layer comprises polyolefin elastomer, smaller amounts of polyolefin may generally be used. The resin for use in a tie layer can be prepared from the components discussed above using techniques known to those of skill in the art based on the teachings herein.

When formed into a tie layer, resins of the present invention can provide a number of advantages. For example, in addition to providing adhesion between adjacent layers, tie layers formed from some embodiments of the present invention can further act as a moisture and/or gas barrier, particularly when positioned adjacent to a conventional barrier layer, such as a barrier layer comprising ethylene vinyl alcohol and/or polyamide. This can advantageously protect against deterioration of gas barrier properties when a multilayer structure is exposed to high moisture or relative humidity in some embodiments. Likewise, the use of such tie layers, in some embodiments, can eliminate the need for other approaches to protect against gas barrier deterioration (e.g., increasing the thickness of LDPE or LLDPE layers in the structure, adding HDPE layer(s) to the structure, including an extra amount of EVOH or polyamide in the barrier layer or structure, etc.).

In some embodiments, a tie layer formed from a resin of the present invention exhibits a water vapor transmission rate of 8 g·mil/m2/day or less when measured according to ASTM F1249. In some embodiments, a tie layer formed from a resin of the present invention exhibits a water vapor transmission rate of 3.1 g·mil/m2/day or less when measured according to ASTM F1249. In some embodiments, a tie layer formed from a resin of the present invention exhibits a water vapor transmission rate of 2.0 g·mil/m2/day or less when measured according to ASTM F1249. In some embodiments, a tie layer formed from a resin of the present invention exhibits a water vapor transmission rate of 1.0 g·mil/m2/day or less when measured according to ASTM F1249.

Barrier Layer

In embodiments of the present invention related to multilayer structures, a tie layer formed from a resin of the present invention can be in adhering contact with a barrier layer. The barrier layer may comprise one or more polyamides (nylons), amorphous polyamides (nylons), and/or ethylene vinyl alcohol copolymers (EVOH), and can include scavenger materials and compounds of heavy metals like cobalt with MXD6 nylon. EVOH includes a vinyl alcohol copolymer having 27 to 44 mol % ethylene, and is prepared by, for example, hydrolysis of vinyl acetate copolymers. Examples of commercially available EVOH that can be used in embodiments of the present invention include EVAL™ from Kuraray and Noltex™ and Soarnol™ from Nippon Goshei.

In some embodiments, the barrier layer can comprise EVOH and an anhydride and/or carboxylic acid functionalized ethylene/alpha-olefin interpolymer, such as those barrier layers disclosed in PCT Publication No. WO 2014/113623, which is hereby incorporated by reference. This inclusion of anhydride and/or carboxylic acid functionalized ethylene/alpha-olefin interpolymer can enhance the flex crack resistance of the EVOH, and is believed to provide less points of stress at the interlayer with the tie resin, hence decreasing formation of voids that could negatively impact the gas barrier properties of the overall multilayer structure.

In embodiments where the barrier layer comprises polyamide, the polyamide can include polyamide 6, polyamide 9, polyamide 10, polyamide 11, polyamide 12, polyamide 6,6, polyamide 6/66 and aromatic polyamide such as polyamide 6I, polyamide 6T, MXD6, or combinations thereof.

In some embodiments, tie layers formed from a resin of the present invention can be in adhering contact with a top facial surface and a bottom facial surface of a barrier layer.

Other Layers

In some embodiments, a tie layer formed from a resin of the present invention can be in adhering contact with another layer, in addition to a barrier layer. For example, in some embodiments, the tie layer can additionally be in adhering contact with a layer comprising polyethylene (i.e., the tie layer is between the polyethylene layer and the barrier layer). In such an embodiment, the polyethylene can be any polyethylene and its derivatives (e.g., ethylene-propylene copolymer) known to those of skill in the art to be suitable for use as a layer in a multilayer structure based on the teachings herein. The polyethylene can be used in such a layer, as well as other layers in the multilayer structure, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), homogeneously branched ethylene/α-olefin copolymers made with a single site catalyst such as a metallocene catalyst or a constrained geometry catalyst, and combinations thereof.

Some embodiments of multilayer structures can include layers beyond those described above. For example, while not necessarily in adhering contact with a tie layer according to the present invention, a multilayer structure can further comprise other layers typically included in multilayer structures depending on the application including, for example, other barrier layers, sealant layers, other tie layers, other polyethylene layers, polypropylene layers, etc. For example, in some embodiments, a multilayer structure of the present invention can include both an inventive tie layer (e.g., a tie layer formed from a resin of the present invention) and a conventional tie layer. As to conventional tie layers, the conventional tie layer can be any tie layer known to those of skill in the art to be suitable for use in adhering different layers in a multilayer structure based on the teachings herein.

Additionally, other layers such as printed, high modulus, high gloss layers may be laminated to multilayer structures (e.g., films) of the present invention. Further, in some embodiments, the multi-layer structure can be extrusion coated to a fiber containing substrate such as paper.

To those skilled in the art, the addition of a catalyst will enhance the bonding of the maleic anhydride to a reactive proton such as in an alcohol (OH functionality), amine (NH functionality), metal hydroxide (metal —OH functionality), and sulfide (SH functionality). These functional groups may be a chemical component in a bonding polymer such as in polyethylene terephthalate (PET), polylactic acid, polyethylene glycol, and others containing the aforementioned functionalities. It is further anticipated that those skilled in the art could induce hydroxide functionality via high energy surface activation such as using corona discharge or flame treatment. Thus, tie layers formed from a resin of the present invention can be used between a variety of other layers in a multilayer structure as will be evident to those of skill in the art based on the teachings herein.

Additives

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

Multilayer Structures

Tie layers formed from resins of the present invention can be incorporated in a variety of multilayer structures. Such tie layers are particularly useful in multilayer structures where gas and/or moisture resistance is a desirable feature. As noted above, in some such embodiments, the multilayer structure will include at least one barrier layer (e.g., a layer comprising polyamide and/or EVOH) with a tie layer according to the present invention in adhering contact with either or both surfaces of the barrier layer. A number of examples of such structures are disclosed elsewhere in the present application. Such structures can include a number of other layers as will be apparent to those of skill in the art based on the teachings herein.

As another example, tie layers formed from resins of the present invention can also be used in adhering a polyethylene layer to a polypropylene layer, a polyethylene layer to a polyethylene terephthalate layer, and others.

For example, in one embodiment, a multilayer structure of the present invention can have an A/B/C/B/E structure as follows: polyethylene/inventive tie layer/barrier layer (EVOH or polyamide)/inventive tie layer/polyethylene.

As another example, a multilayer structure of the present invention can have an A/B/C/B/C/B/E structure as follows: polyethylene/inventive tie layer/barrier layer (EVOH or polyamide)/inventive tie layer/barrier layer (EVOH or polyamide)/inventive tie layer/polyethylene.

As another example, a multilayer structure of the present invention can have an A/B/C/D/C/B/E structure as follows: polyethylene/inventive tie layer/barrier layer (polyamide)/barrier layer (EVOH)/barrier layer (polyamide)/inventive tie layer/polyethylene.

As another example, a multilayer structure of the present invention can have an A/B/C/D/E/D/F structure as follows: (biaxially oriented polyethylene terephthalate or biaxially oriented polyamide or biaxially oriented polypropylene)/adhesive layer/polyethylene/inventive tie layer/barrier layer (EVOH or polyamide)/inventive tie layer/polyethylene.

As another example, a multilayer structure of the present invention can have an A/B/C/B/E/B/F structure as follows: polyethylene/inventive tie layer/barrier layer (EVOH)/inventive tie layer/polyethylene/inventive tie layer/polyamide. In a further embodiment, the multilayer structure can further comprise a fiber containing substrate that is extrusion laminated to the A/B/C/B/E/B/F structure.

As another example, a multilayer structure of the present invention can have an A/B/C/D/E structure as follows: polyethylene/inventive tie layer/barrier layer (EVOH or polyamide)/conventional tie layer/polyethylene.

As another example, a multilayer structure of the present invention can have an A/B/C/D/C/D/E structure as follows: polyethylene/inventive tie layer/barrier layer (EVOH or polyamide)/conventional tie layer/barrier layer (EVOH or polyamide)/conventional tie layer/polyethylene.

As another example, a multilayer structure of the present invention can have an A/B/C/D/C/E/F structure as follows: polyethylene/inventive tie layer/barrier layer (polyamide)/barrier layer (EVOH)/barrier layer (polyamide)/conventional tie layer/polyethylene.

As another example, a multilayer structure of the present invention can have an A/B/C/D/E/F/G structure as follows: (biaxially oriented polyethylene terephthalate or biaxially oriented polyamide or biaxially oriented polypropylene)/adhesive layer/polyethylene/conventional tie layer/barrier layer (EVOH or polyamide)/inventive tie layer/polyethylene.

As another example a multilayer structure of the present invention can have an A/B/C/D/E/D/F structure as follows: polyethylene/inventive tie layer/barrier layer (EVOH)/conventional tie layer/polyethylene/conventional tie layer/polyamide. In a further embodiment, the multilayer structure can further comprise a fiber containing substrate that is extrusion laminated to the structure.

Some of the above exemplary multilayer structures have polyethylene layers that are identified using different layer designations (e.g., in the first example, Layers A and E are each polyethylene layers). It should be understood that in some embodiments, such polyethylene layers can be formed from the same polyethylene, or polyethylene blends, while in other embodiments, such polyethylene layers can be formed from different polyethylenes or polyethylene blends. In some embodiments, such polyethylene layers (e.g., in the first example, Layers A and E) can be the outermost layers or skin layers. In other embodiments, the multilayer structure may comprise one or more additional layers adjacent to such polyethylene layers. It should be understood that for the examples above, the first and last layers identified for each example may be the outermost layer in some embodiments, while in other embodiments, one or more additional layers may be adjacent to such layers.

When a multilayer structure comprising the combinations of layers disclosed herein is a multilayer film, the film can have a variety of thicknesses depending, for example, on the number of layers, the intended use of the film, and other factors. In some embodiments, multilayer films of the present invention have a thickness of 15 microns to 5 millimeters. Multilayer films of the present invention, in some embodiments, have a thickness of 20 to 500 microns (preferably 50-200 microns). When the multilayer structure is something other than a film (e.g., a rigid container, a pipe, etc.), such structures can have a thickness within the ranges typically used for such types of structures.

Multilayer structures of the present invention can exhibit one or more desirable properties. For example, in some embodiments, multilayer structures can exhibit desirable barrier properties, temperature resistance, optical properties, stiffness, sealing, toughness, puncture resistance, and others.

Methods of Preparing Multilayer Structures

When the multilayer structure is a multilayer film or formed from a multilayer film, such multilayer films can be coextruded as blown films or cast films using techniques known to those of skill in the art based on the teachings herein. In particular, based on the compositions of the different film layers disclosed herein, blown film manufacturing lines and cast film manufacturing lines can be configured to coextrude multilayer films of the present invention in a single extrusion step using techniques known to those of skill in the art based on the teachings herein.

Articles

Multilayer films of the present invention can be formed into a variety of articles using techniques known to those of skill in the art including, for example, packages, sheets, pipes, and others.

Multilayer films of the present invention can be formed into a variety of packages using techniques known to those of skill in the art. In general, multilayer films of the present invention can be converted into any form of package and deployed under a variety of environmental conditions. Films of the present invention, in some embodiments, can be particularly useful in converted packages that are subject to, or must undergo high moisture conditions, throughout their service life.

Examples of packages that can be formed from multilayer films of the present invention include, without limitation, stand-up pouches, bags, extrusion coated paper boards, and others.

Other multilayer structures that can be formed include, for example, multilayer sheets, laminated films, multilayer rigid containers, multilayer pipes, and multilayer coated substrates. Such articles can be formed using techniques known to those of skill in the art based on the teachings herein.

Some embodiments of the invention will now be described in detail in the following Examples.

EXAMPLES

Example 1

An inventive resin for use as a tie layer according to one embodiment of the present invention is prepared as Inventive Composition 1. Inventive Composition 1 comprises 80% by weight of a nucleated high density polyethylene and 20% by weight of a maleic anhydride grafted, nucleated high density polyethylene. The nucleated high density polyethylene making up 80% by weight of Inventive Composition 1 is prepared as follows. A nucleator (Hyperform HPN20E from Milliken Chemical) is first well dispersed in a small amount of HDPE to form a masterbatch. The HDPE used to form the masterbatch has a density of 0.965 g/cm$^3$ and a melt index ($I_2$) of 8.3 g/10 minutes. The concentration of the nucleator in the masterbatch is in the range of 2 to 5 wt %. The masterbatch is further well dispersed into the bulk of HDPE (density of 0.962 g/cm$^3$ and melt index ($I_2$) of 0.85 g/10 minutes) such that the final nucleator content is in the range of 100 to 3000 pm. The high density polyethylene after nucleation has a density of 0.963 g/cm$^3$ and a melt index ($I_2$) of 1.2 g/10 minutes.

This same nucleated high density polyethylene is grafted with maleic anhydride by reactive extrusion. A co-rotating twin screw extruder with medium intensity screws is used for the grafting. The formulations consist of the nucleated high density polyethylene, catalyst, maleic anhydride, and peroxide (POX) which is diluted with mineral oil to enhance ease of handling and feeding. The maleic anhydride feed level is between 1 to 5 wt %. Peroxide typically used in the grafting of maleic anhydride to polyethylene as well as a Lewis acid catalyst (zinc triflate) are fed at appropriate concentrations. An exemplary temperature profile of the extruder for grafting is as follows: Zone 1-350° F.; Zone 2-350° F.; Zone 3-350° F.; Zone 4-300° F.; Zone 5-350° F.; Zone 6-350° F.; Zone 7-350° F.; Zone 8-350° F.; Zone 9-250° F.; Zone 10-250° F.; Zone 11-250° F.; S/C-350° F.; PDV-350° F.; Die-400° F. The maleic anhydride grafted, nucleated high density polyethylene has a density of 0.963 g/cm$^3$ and a melt index ($I_2$) of 1.2 g/10 minutes.

The maleic anhydride content of Inventive Composition 1 is ~0.2 weight percent. The melt index ($I_2$) of Inventive Composition 1 is 1 g/10 minutes.

For a comparative tie resin composition (Comparative Composition 1), AMPLIFY™ TY 1353 (commercially available from The Dow Chemical Company) is used. AMPLIFY™ TY 1353 has a density of 0.921 g/cm$^3$, a melt index ($I_2$) of 2.0 g/10 minutes, and a maleic anhydride content of ~0.2%.

Multilayer films are prepared using Inventive Composition 1 and Comparative Composition 1 as tie layers with Inventive Film 1 referring to the film using Inventive Composition 1 as its tie layers and Comparative Film 1 referring to the film using Comparative Composition 1 as its tie layers. Each film is a five layer film with a nominal thickness of 2 mils. The films have the following structure:

LLDPE (0.6 mil)/Tie (0.2 mil)/EVOH (0.4 mil)/Tie (0.2 mil)/LLDPE (0.6 mil). The LLDPE used is DOWLEX™ 2045G, commercially available from The Dow Chemical Company. The EVOH layer is formed from EVAL H171B, commercially available from Kuraray America, Inc.

The secant moduli of Inventive Film 1 and Comparative Film 1 are measured according to ASTM D882. In the machine direction, the 1% and 2% secant moduli of Inventive Film 1 are 114 kpsi and 101 kpsi, respectively, as compared to 96 kpsi and 82 kpsi for Comparative Film 1. In the cross direction, the 1% and 2% secant moduli of Inventive Film 1 are 107 kpsi and 93 kpsi, respectively, as compared to 96 kpsi and 80 kpsi for Comparative Film 1. This data demonstrate that even though the tie resins only make up 20% of the film, the modulus of the film is increased up to 25% by using Inventive Composition 1 as opposed to Comparative Composition 1 as the tie layer.

Example 2

In this Example, 4 mil, multilayer films are prepared using Inventive Composition 1 and Comparative Composition 1 as tie layers with Inventive Film 2 referring to the film using Inventive Composition 1 as its tie layers and Comparative Film 2 referring to the film using Comparative Composition 1 as its tie layers. Each film is a five layer film with a nominal thickness of 4 mils. The films have the following structure:

LLDPE (1.2 mil)/Tie (0.4 mil)/EVOH (0.8 mil)/Tie (0.4 mil)/LLDPE (1.2 mil). The same LLDPE and EVOH from Example 1 are used in these films.

The water vapor transmission rate (WVTR) and oxygen transmission rate (OTR) of the films are determined. Inventive Film 2 exhibits a WVTR of 5.40 g·mil/m$^2$/day and an OTR of 7.84 cc·mil/m$^2$/day. Comparative Film 2 exhibits a WVTR of 7.96 g·mil/m$^2$/day and an OTR of 18.44 cc·mil/m$^2$/day. These data clearly demonstrate that Inventive Composition 1, when used as a tie layer, improves the barrier properties of a film as compared to Comparative Composition 1. Specifically, the use of Comparative Composition 1 as the tie layer shows a reduction of ~32% in WVTR and a reduction of ~57% in OTR. The reduction in WVTR is the equivalent to the addition of 5 mils of LLDPE to the film. The reduction in OTR is equivalent to doubling the thickness of the EVOH layer.

Example 3

In this Example, 4 mil, multilayer films are prepared using Inventive Composition 1 and Comparative Composition 1 as tie layers with Inventive Film 3 referring to the film using Inventive Composition 1 as its tie layers and Comparative Film 3 referring to the film using Comparative Composition 1 as its tie layers. Each film is a five layer film with a nominal thickness of 4 mils. For these films, nylon was used as a barrier layer rather than EVOH. The films have the following structure:

LLDPE (1.2 mil)/Tie (0.4 mil)/Nylon (0.8 mil)/Tie (0.4 mil)/LLDPE (1.2 mil). The same LLDPE from Example 1 is used in these films. The nylon layer is formed from Ultramid C 33L 01, commercially available from BASF.

The water vapor transmission rate (WVTR) and oxygen transmission rate (OTR) of the films are determined. Inventive Film 3 exhibits a WVTR of 6.76 g·mil/m$^2$/day and an OTR of 612 cc·mil/m$^2$/day. Comparative Film 3 exhibits a WVTR of 10.36 g·mil/m$^2$/day and an OTR of 683 cc·mil/m$^2$/day. These data clearly demonstrate that Inventive Composition 1, when used as a tie layer, improves the barrier properties of a film as compared to Comparative Composition 1. Specifically, the use of Comparative Composition 1 as the tie layer shows a reduction of ~35% in WVTR and a reduction of ~10% in OTR.

The adhesion strength of the films is also determined. Inventive Film 3 exhibits an adhesion strength of 13 N/inch, and Comparative Film 3 exhibits an adhesion strength of 15 N/inch. Thus, the adhesion strength of the tie layer formed from Inventive Composition 1 is only slightly lower than that of the tie layer formed from Comparative Composition 1.

Example 4

Additional inventive resin compositions are prepared as follows. Inventive Composition 2 is prepared using 80% by weight nucleated high density polyethylene, 20% by weight maleic anhydride grafted, nucleated high density polyethylene, and 75 ppm of a catalyst. The nucleated high density polyethylene and maleic anhydride grafted, nucleated high density polyethylene are the same as used in Inventive Composition 1. The catalyst for Inventive Composition 2 is zinc triflate (zinc trifluoromethanesulfonate).

Inventive Composition 3 is prepared using 75% by weight nucleated high density polyethylene, 20% by weight maleic anhydride grafted, nucleated high density polyethylene, 75 ppm of a catalyst, and 5% by weight of a polyolefin elastomer. The nucleated high density polyethylene and maleic anhydride grafted, nucleated high density polyethylene are the same as used in Inventive Composition 1. The catalyst for Inventive Composition 3 is zinc triflate (zinc trifluoromethanesulfonate). The polyolefin elastomer is ENGAGE™ 8402, which is commercially available from The Dow Chemical Company.

Multilayer films are prepared using Inventive Composition 1, Inventive Composition 2, Inventive Composition 3, and Comparative Composition 1 as tie layers with Inventive Film 4 referring to the film using Inventive Composition 1 as its tie layers, Inventive Film 5 referring to the film using Inventive Composition 2 as its tie layers, Inventive Film 6 referring to the film using Inventive Composition 3 as its tie layers, and Comparative Film 4 referring to the film using Comparative Composition 1 as its tie layers. Each film is a five layer film with a nominal thickness of 4 mils. The films have the following structure:

LLDPE (1.2 mil)/Tie (0.4 mil)/EVOH (0.8 mil)/Tie (0.4 mil)/LLDPE (1.2 mil). The same LLDPE and EVOH from Example 1 are used in these films.

The WVTR, OTR, and adhesion strength of the films are measured. Table 1 shows the results.

TABLE 1

| | WVTR (g · mil/m²/day) | OTR (cc · mil/m²/day) | Adhesion Strength (N/inch) |
|---|---|---|---|
| Inventive Film 4 | 6.8 | 11.3 | 4.7 |
| Inventive Film 5 | 7.2 | 12.4 | 7.0 |
| Inventive Film 6 | 8.8 | 14.8 | 10.1 |
| Comp. Film 4 | 10.8 | 16.8 | 14.7 |

By adding 75 ppm catalyst, the adhesion strength of the film using Inventive Composition 2 as tie layers (Inventive Film 5) is increased by ~50% from 4.5 N/inch to 7 N/inch as compared to the film using Inventive Composition 1 (Inventive Film 4). The adhesion strength is further increased with the inclusion of a polyolefin elastomer in the composition (compare Inventive Film 6 with the polyolefin elastomer to Inventive Film 5). However, as shown by the WVTR and OTR data, the improvement in adhesion strength of Inventive Film 6 comes at the expense of barrier properties.

In addition, the use of a catalyst slightly increases the permeation rates (WVTR and OTR) (compare Inventive Film 5 with catalyst to Inventive Film 4), but the magnitude of the change is overall very small. Nonetheless, the magnitude of change is very small. Overall, the barrier properties of Inventive Films 4-6 are lower than those of Comparative Film 4.

Example 5

In this Example, the effect of the inclusion of a catalyst in a tie resin on adhesion strength is evaluated. Four resin compositions are prepared with each comprising 80% by weight of nucleated high density polyethylene (same as used in Example 1) and 20% by weight of maleic anhydride grafted, nucleated high density polyethylene (same as used in Example 1). Inventive Composition 4 does not include any catalyst, while Inventive Composition 5 includes 35 ppm catalyst, Inventive Composition 6 includes 55 ppm catalyst, and Inventive Composition 7 includes 75 ppm catalyst. The catalyst used is zinc triflate (zinc trifluoromethanesulfonate).

Multilayer films are prepared using Inventive Composition 4, Inventive Composition 5, Inventive Composition 6, and Inventive Composition 8 as tie layers. Each film is a five layer film with a nominal thickness of 4 mils. The films have the following structure:

LLDPE (1.2 mil)/Tie (0.4 mil)/EVOH (0.8 mil)/Tie (0.4 mil)/LLDPE (1.2 mil). The same LLDPE and EVOH from Example 1 are used in these films.

The adhesion strengths of the films are measured according to ASTM F904. The results are shown in Table 2.

TABLE 2

| | Catalyst Concentration (ppm) | Adhesion Strength (N/inch) |
|---|---|---|
| Inventive Comp. 4 | 0 | 4.7 |
| Inventive Comp. 5 | 35 | 5.2 |
| Inventive Comp. 6 | 55 | 6.1 |
| Inventive Comp. 7 | 75 | 5.7 |

The results indicate that the adhesion strength initially increases with the catalyst concentration, then levels off, and seems to eventually decrease with the concentration. Nonetheless, the data show that adhesion strength can be improved significantly with only a small amount of Lewis acid catalyst.

Example 6

An additional inventive resin composition is prepared as follows. Inventive Composition 8 is prepared using 80% by weight nucleated high density polyethylene and 20% by weight maleic anhydride grafted, nucleated high density polyethylene, wherein the maleic anhydride grafted, nucleated high density polyethylene contains 6% catalyst masterbatch and the catalyst masterbatch contains 5000 ppm of catalyst.

The nucleated high density polyethylene making up 80% by weight of Inventive Composition 8 is the same as used in Inventive Composition 1.

The maleic anhydride grafted, nucleated high density polyethylene is AMPLIFY™ TY 1053H (commercially available from The Dow Chemical Company) is used. AMPLIFY™ TY 1053H has a density of 0.958 g/cm³, a melt index ($I_2$) of 2.0 g/10 minutes, and a maleic anhydride content of >1.0 weight %.

The maleic anhydride content of Inventive Composition 8 is ~0.27 weight percent. The melt index ($I_2$) of Inventive Composition 8 is 1 g/10 minutes.

The catalyst for Inventive Composition 8 is zinc triflate (zinc trifluoromethanesulfonate).

Multilayer films having 5 layers are prepared using Inventive Composition 8. Each film has a nominal thickness of 2 mils. The 5 layer films have the following structures:

Comparative Film 5: LLDPE (0.52 mil)/Conventional Tie (0.2 mil)/EVOH (0.36 mil)/Conventional Tie (0.4 mil)/LLDPE (0.52 mil).

Inventive Film 7: LLDPE (0.52 mil)/Conventional Tie (0.2 mil)/EVOH (0.36 mil)/Inventive Composition 8 (0.4 mil)/LLDPE (0.52 mil).

Inventive Film 8: LLDPE (0.52 mil)/Inventive Composition 8 (0.2 mil)/EVOH (0.36 mil)/Inventive Composition 8 (0.4 mil)/LLDPE (0.52 mil).

The same LLDPE and EVOH from Example 1 are used in these films. The Conventional Tie is AMPLIFY™ TY 1353 (commercially available from The Dow Chemical Company).

Multilayer films having 7 layers are also prepared using Inventive Composition 8. Each film has a nominal thickness of 2.5 mils. The 7 layer films have the following structures:

Comparative Film 6: LLDPE (0.45 mil)/Conventional Tie (0.2 mil)/Nylon (0.18 mil)/EVOH (0.45 mil)/Nylon (0.18 mil)/Conventional Tie (0.4 mil)/LLDPE (0.64 mil).

Inventive Film 9: LLDPE (0.45 mil)/Conventional Tie (0.2 mil)/Nylon (0.18 mil)/EVOH (0.45 mil)/Nylon (0.18 mil)/Inventive Composition 8 (0.4 mil)/LLDPE (0.64 mil).

Inventive Film 10: LLDPE (0.45 mil)/Inventive Composition 8 (0.2 mil)/Nylon (0.18 mil)/EVOH (0.45 mil)/Nylon (0.18 mil)/Inventive Composition 8 (0.4 mil)/LLDPE (0.64 mil).

The same LLDPE and EVOH from Example 1 are used in these films. The same nylon from Example 3 is used in these films. The Conventional Tie is AMPLIFY™ TY 1353 (commercially available from The Dow Chemical Company).

The OTR at 23° C. (relative humidity=90%) and at 35° C. (relative humidity=90%), WVTR at 37.8° C. and 90% relative humidity, adhesion strength, and secant modulus (1%) in the machine direction of the films are measured. Table 3 shows the results.

TABLE 3

| | OTR (cc/100 inch$^2$/day) 23° C. | OTR (cc/100 inch$^2$/day) 35° C. | WVTR (g/100 inch$^2$/day) | Adhesion (N/15 mm) | Secant Modulus (1%), MD (psi) |
|---|---|---|---|---|---|
| Comparative Film 5 | 0.67 | 2.31 | 0.24 | >11 | 81634 |
| Inventive Film 7 | 0.45 | 2.03 | 0.19 | >11 | 101841 |
| Inventive Film 8 | 0.47 | 2.28 | 0.16 | >11 | 106725 |
| Comparative Film 6 | 0.48 | 1.87 | 0.30 | 11 | 94688 |
| Inventive Film 9 | 0.45 | 1.76 | 0.21 | >11 | 113688 |
| Inventive Film 10 | 0.36 | 1.46 | 0.16 | >11 | 145675 |

As shown above, the inclusion of Inventive Composition 8 as a tie layer in these films provides up to 33% reduction in OTR for a 5 layer film and up to 25% reduction in OTR for a 7 layer film. The WVTR values for these films are also reduced up to 33% for the 5 layer film and up to 47% for the 7 layer film. Inventive Composition 8 shows similar adhesion to EVOH and nylon as the standard tie layer resin while providing higher modulus.

That which is claimed is:

1. A resin for use as a tie layer in a multilayer structure, the resin comprising:
    a high density polyethylene having a density greater than 0.960 g/cm$^3$, wherein the high density polyethylene comprises 1 to 99 weight percent of the resin;
    a maleic anhydride grafted high density polyethylene, wherein the maleic anhydride grafted high density polyethylene comprises 1 to 99 weight percent of the resin; and
    a catalyst comprising the catalyst comprises zinc triflate, bismuth triflate, copper triflate, magnesium triflate, nickel triflate, tin triflate, or combinations thereof.

2. The resin of claim 1, wherein the resin further comprises a nucleator.

3. The resin of claim 1, wherein the high density polyethylene has a density greater than 0.962 g/cm$^3$.

4. The resin of claim 1, wherein the maleic anhydride grafted high density polyethylene has a density greater than 0.962 g/cm$^3$ and a grafted maleic anhydride level of 0.1 and 2.0 wt % maleic anhydride based on the weight of the maleic anhydride grafted high density polyethylene.

5. The resin of claim 1, wherein the high density polyethylene comprises 70 to 95 weight percent of the resin.

6. The resin of claim 1, wherein the maleic anhydride grafted high density polyethylene comprises 5 to 30 weight percent of the resin.

7. The resin of claim 1, wherein the resin is substantially free of organometallic compounds and metal carboxylates.

8. The resin of claim 1, wherein the resin comprises 10-200 parts per million by weight of the catalyst based on the total weight of the resin.

9. The resin of claim 1, wherein the resin further comprises a polyolefin elastomer.

10. A multilayer structure comprising at least three layers, each layer having opposing facial surfaces and arranged in the order A/B/C, wherein:
    Layer A comprises polyethylene;
    Layer B comprises the resin of claim 1, wherein a top facial surface of Layer B is in adhering contact with a bottom facial surface of Layer A; and
    Layer C comprises polyamide, ethylene vinyl alcohol, or combinations thereof, wherein a top facial surface of Layer C is in adhering contact with a bottom facial surface of Layer B.

11. The multilayer structure of claim 10, wherein Layer B exhibits a water vapor transmission rate of 8 g·mil/m$^2$/day or less when measured according to ASTM F1249.

12. An article formed from the multilayer structure of claim 10, wherein the article comprises a package, a sheet, or a pipe.

13. A multilayer structure comprising at least four layers, each layer having opposing facial surfaces and arranged in the order A/B/C/D, wherein:
    Layer A comprises polyethylene;
    Layer B comprises the resin of claim 1, wherein a top facial surface of Layer B is in adhering contact with a bottom facial surface of Layer A;
    Layer C comprises polyamide, ethylene vinyl alcohol, or combinations thereof, wherein a top facial surface of Layer C is in adhering contact with a bottom facial surface of Layer B; and
    Layer D comprises the resin of claim 1, wherein a top facial surface of Layer D is in adhering contact with a bottom facial surface of Layer C.

\* \* \* \* \*